(12) United States Patent
Heinonen et al.

(10) Patent No.: US 7,249,182 B1
(45) Date of Patent: Jul. 24, 2007

(54) PERSONAL PROFILE SHARING AND MANAGEMENT FOR SHORT-RANGE WIRELESS TERMINALS

(75) Inventors: Tomi Heinonen, Tampere (FI); Timo Laitinen, Tampere (FI); Stephan Bouet, Tokyo (JP); Sany Zakharia, Helsinki (FI)

(73) Assignee: Nokia Corporation, Espoo (FI)

( * ) Notice: Subject to any disclaimer, the term of this patent is extended or adjusted under 35 U.S.C. 154(b) by 598 days.

(21) Appl. No.: 10/083,134

(22) Filed: Feb. 27, 2002

(51) Int. Cl.
G06F 15/16 (2006.01)
(52) U.S. Cl. .................................. 709/227; 709/228
(58) Field of Classification Search ................ 709/206, 709/227, 228, 245
See application file for complete search history.

(56) References Cited

U.S. PATENT DOCUMENTS

| | | |
|---|---|---|
| 6,317,781 B1 | 11/2001 | De Boor et al. |
| 6,414,955 B1 | 7/2002 | Clare et al. |
| 6,421,707 B1 | 7/2002 | Miller et al. |
| 6,560,456 B1 | 5/2003 | Lohtia et al. |
| 6,601,093 B1 * | 7/2003 | Peters .......................... 709/220 |
| 6,826,387 B1 * | 11/2004 | Kammer ...................... 455/41.2 |
| 2002/0002705 A1 | 1/2002 | Byrnes et al. |
| 2003/0002504 A1 | 1/2003 | Forstadius |
| 2003/0027636 A1 | 2/2003 | Covannon et al. |
| 2003/0036350 A1 * | 2/2003 | Jonsson et al. ................ 455/41 |
| 2003/0054794 A1 | 3/2003 | Zhang |
| 2003/0092376 A1 | 5/2003 | Syed |

FOREIGN PATENT DOCUMENTS

| | | |
|---|---|---|
| EP | 1 130 869 | 9/2001 |
| EP | 1 130 869 A1 | 9/2001 |
| EP | 1271885 A2 | 1/2003 |
| JP | 11 110401 A | 7/1999 |
| WO | WO 99/32985 | 7/1999 |
| WO | WO 01/39577 A1 | 6/2001 |
| WO | WO 01/86419 A2 | 11/2001 |

OTHER PUBLICATIONS

Bluetooth, "Specification of the Bluetooth System," Feb. 22, 2001, Bluetooth, Version 1.1, vol. 2, pp. 1-450.*
Jaap Haartsen, "Bluetooth-The universal radio interface for ad hoc wireless connectivity," Ericsson Review No. 3, 1998, pp. 110-117.
The Bluetooth Special Interest Group, Specification of The Bluetooth System, vol. 1 & vol. 2, Core and Profile: Version 1.1, Feb. 22, 2001.
U.S. Appl. No. 10/161,657, filed Jun. 5, 2002, Heinonen et al.

* cited by examiner

Primary Examiner—Jason Cardone
Assistant Examiner—Azizul Choudhury
(74) Attorney, Agent, or Firm—Morgan & Finnegan, L.L.P.

(57) ABSTRACT

A mobile, wireless terminal contains apparatus for creating, editing and storing user personalized profiles for access by inquiring terminals in a short-range communication system. The mobile, wireless terminal contains databases for storing standardized format profiles containing user contact information, standardized format profiles of user interests and user or manufacturer defined profiles. The personalized profiles are stored in a single record of a Service Discovery Protocol database. Screen display apparatus in the mobile terminal displays indexes and contents of the profiles for user access in creating, editing and storing user profiles. The mobile terminal includes apparatus responsive to SDP inquires from inquiring terminals for access to and acquisition of the user defined personalized profiles.

43 Claims, 11 Drawing Sheets

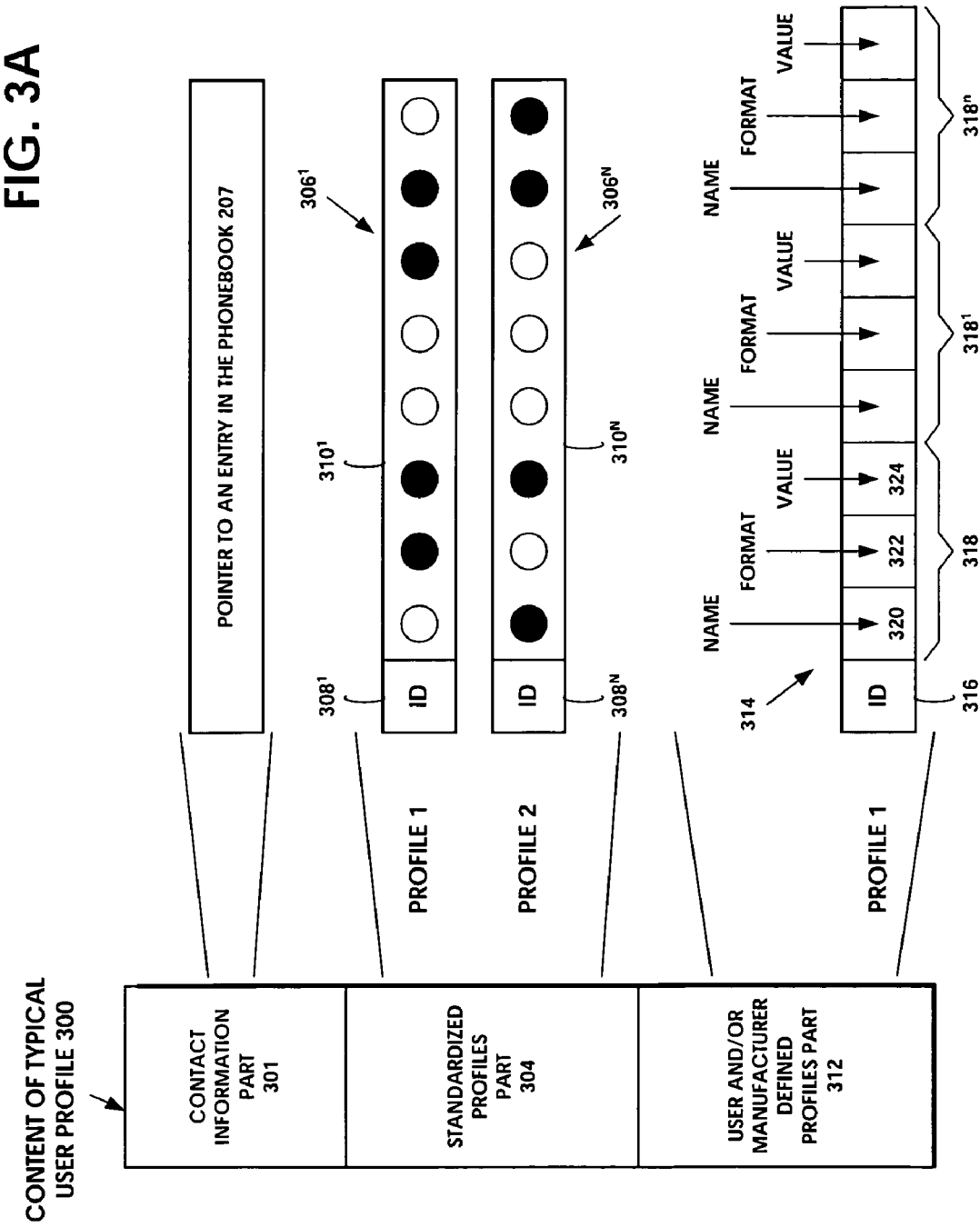

FIG. 4A

```
401
AGENT:
BEGIN:VCARD
VERSION:2.1
N:Friday;Fred
TEL;WORK;VOICE:+1-213-555-1234
TEL;WORK;FAX:+1-213-555-5678
END:VCARD
```

FIG. 4B

```
450
<!DOCTYPE user-profile [
<!ELEMENT user-profile (profile-item*)>
<!ATTLIST user-profile
  version CDATA #FIXED "1.0">
<!ELEMENT user-profile EMPTY>
<!ATTLIST filtering-parameters
  name CDATA #IMPLIED
  type CDATA #IMPLIED
  value CDATA #IMPLIED>
]>
```

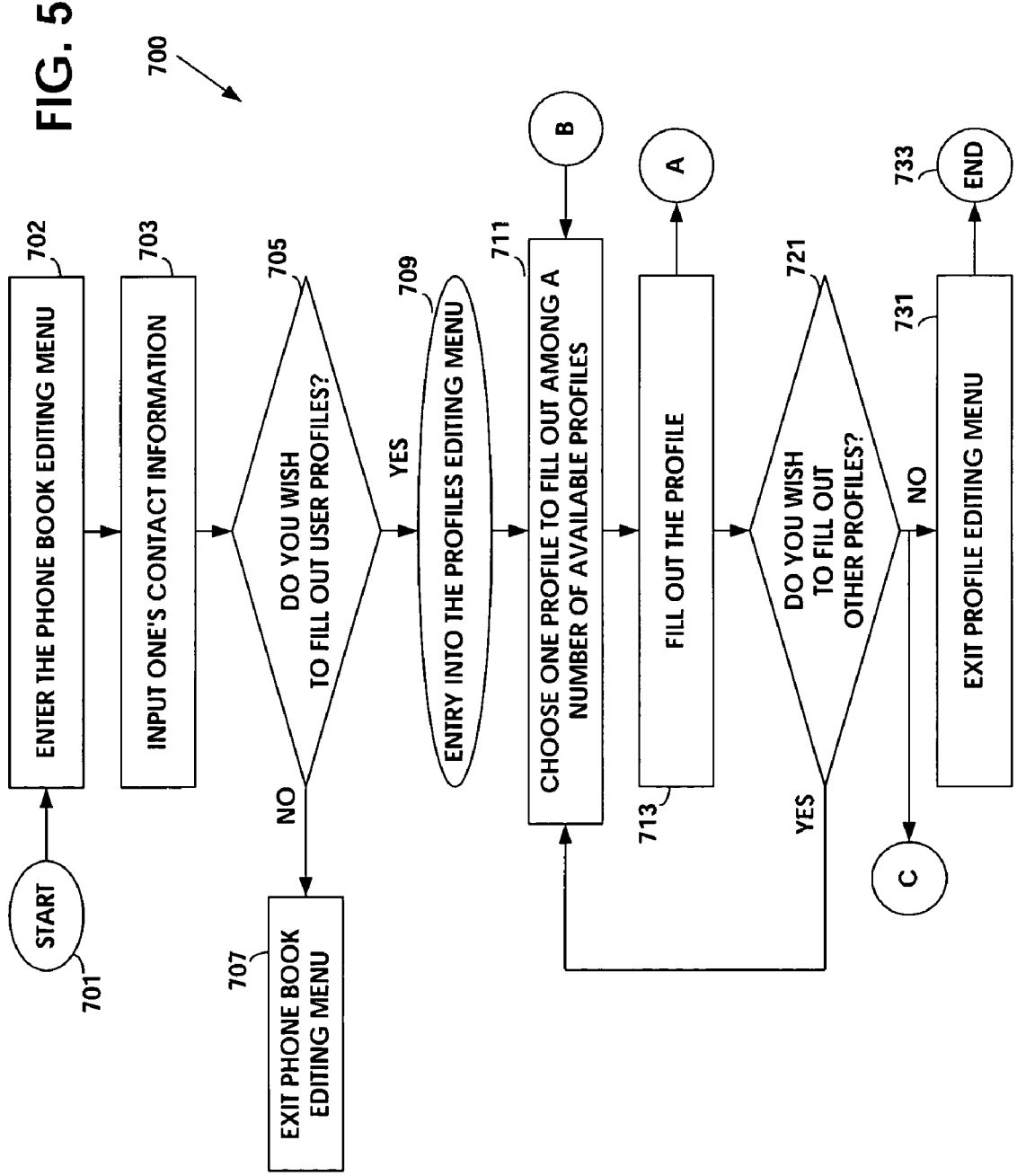

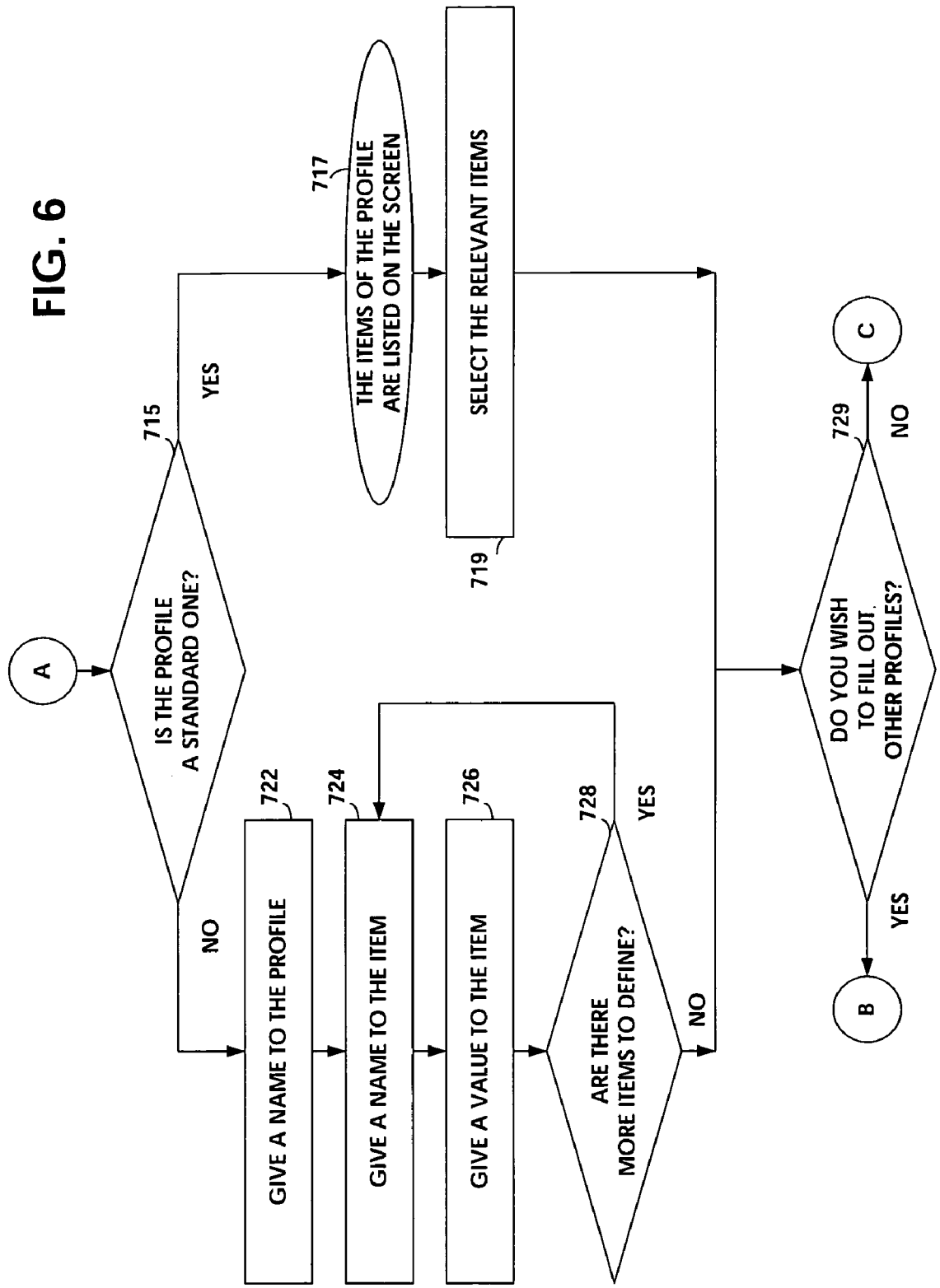

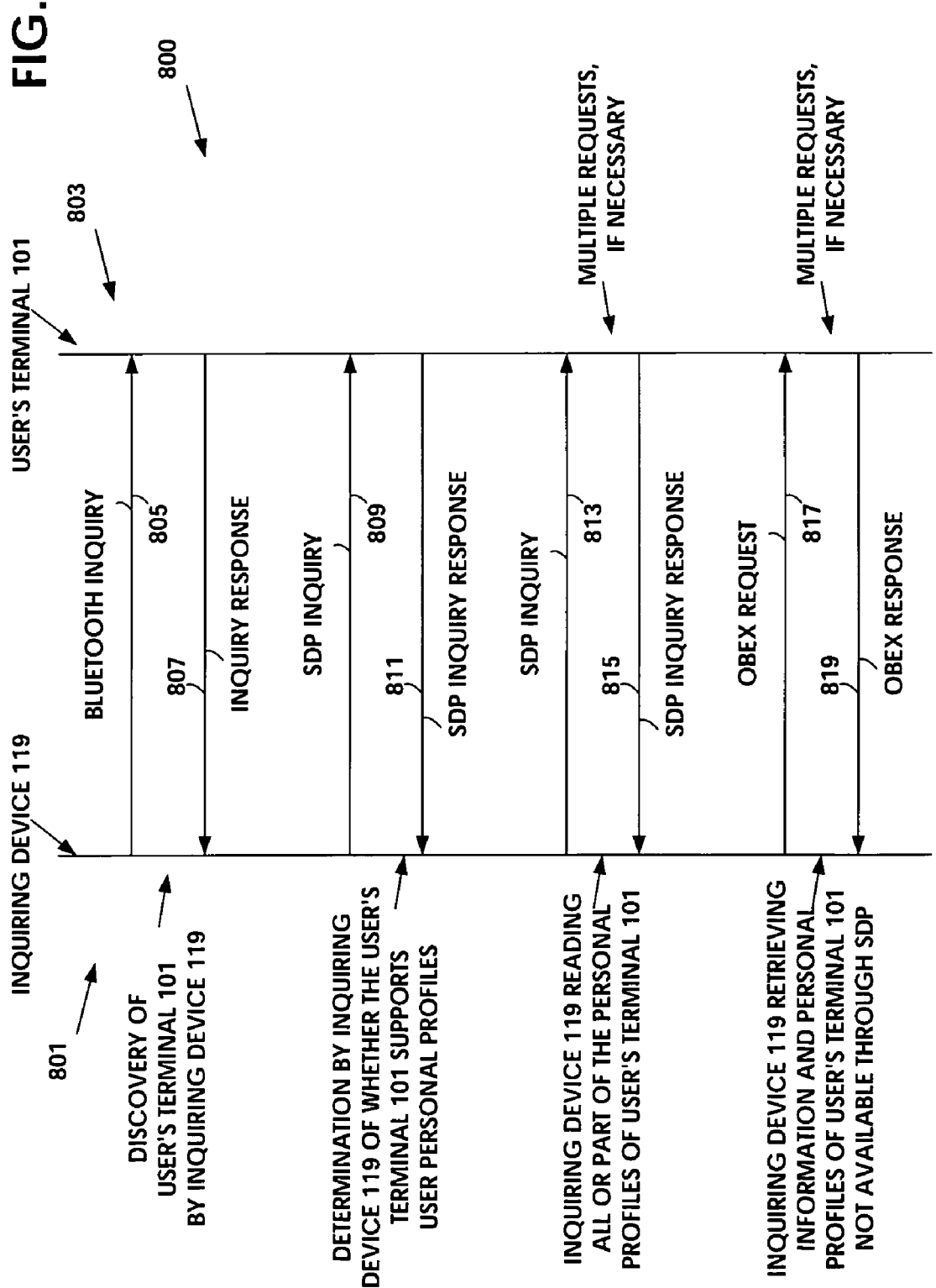

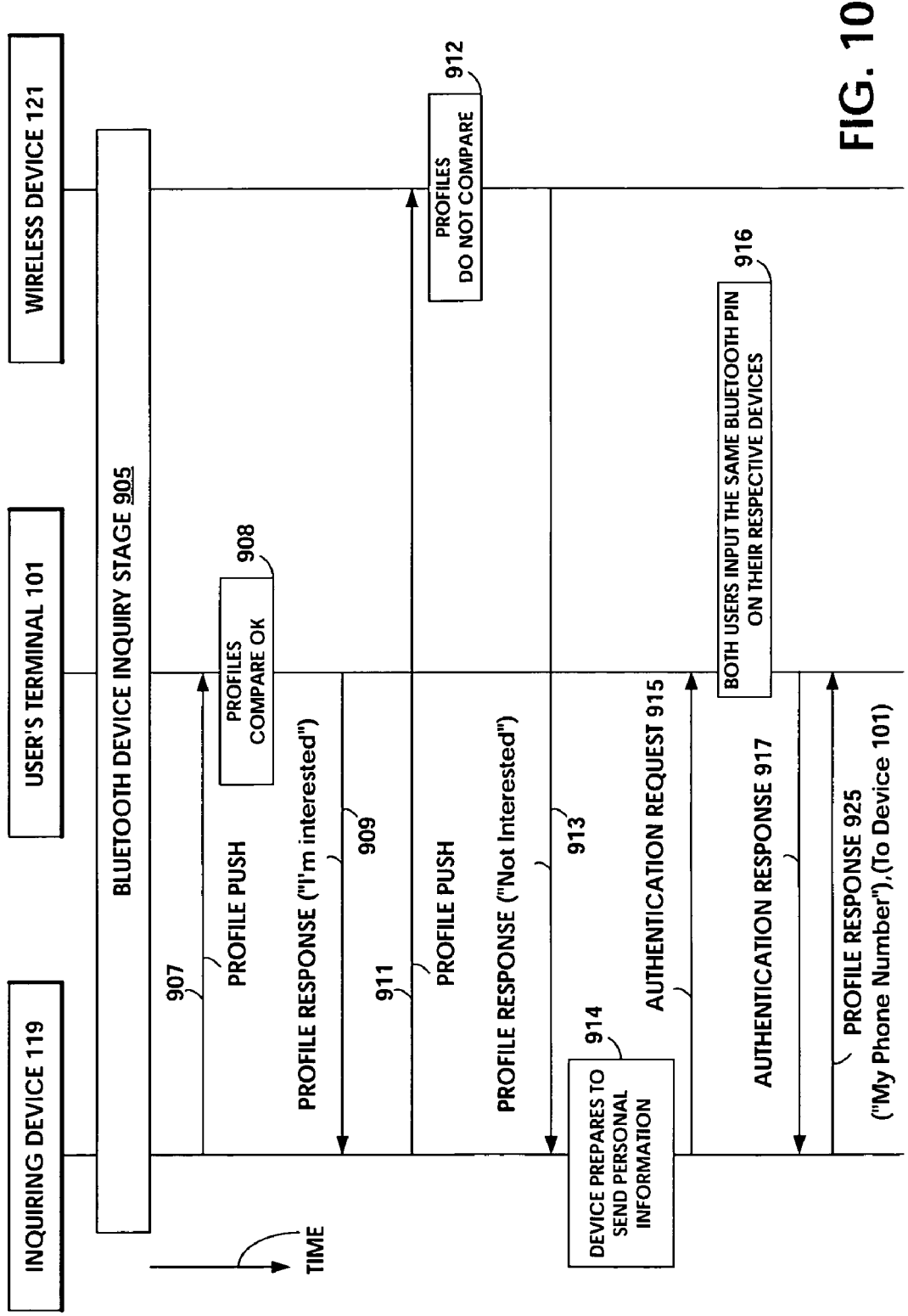

PERSONAL PROFILE SHARING AND MANAGEMENT FOR SHORT-RANGE WIRELESS TERMINALS

FIELD OF THE INVENTION

The invention relates to short-range wireless communication systems, network and methods of operation. More particularly, the invention relates to personal profile sharing and management for ad hoc networks in short-range wireless communication systems using the Bluetooth Standard.

BACKGROUND OF THE INVENTION

An ad hoc network is a short-range wireless system composed primarily of mobile wireless devices which associate together for a relatively short time to carry out a common purpose. A temporary network such as this is called a "piconet" in the Bluetooth Standard, an FU "independent basic service set" (IBSS) in the IEEE 802.11 Wireless LAN Standard, a "subnet" in the HIPERLAN Standard, and generally a radio cell or a "micro-cell" in other wireless LAN technologies. Ad hoc networks have the common property of being an arbitrary collection of wireless devices which are physically close enough to be able to communicate and which are exchanging information on a regular basis. The networks can be constructed quickly and without much planning. Members of the ad hoc network join and leave as they move into and out of the range of each other. Most ad hoc networks operate over unlicensed radio frequencies at speeds of from one to fifty-four Mbps using carrier sense protocols to share the radio spectrum. The distance over which they can communicate ranges from ten meters for Bluetooth ad hoc networks to over one hundred meters for wireless LAN micro-cells in an open environment. ad hoc networks consist primarily of mobile wireless devices, but can also include one or more access points which are stationary wireless devices, operating as a stand-alone server or connected as gateways to other networks.

Bluetooth is a short-range radio network, originally intended as a cable replacement. It can be used to create ad hoc networks of up to eight devices operating together. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten-meter radio communications range and to discover what services they offer, using a service discovery protocol (SDP). The SDP searching function relies on links being established between the requesting Bluetooth device in a client role and the responding Bluetooth device in a server role. Once a link has been established, it can be used to find out about services in the responding Bluetooth device and how to connect to them.

Other wireless standards support ad hoc networks in addition to the Bluetooth standard, the IEEE 802.11 Wireless LAN standard, and the HIPERLAN standard. Examples include the IEEE 802.15 Wireless Personal Area Network (WPAN) standard, the Infrared Data Association (IrDA) standard, the Digital Enhanced Cordless Telecommunications (DECT) standard, the Shared Wireless Access Protocol (SWAP) standard, the Japanese 3rd Generation (3G) wireless standard, and the Multimedia Mobile Access Communication (MMAC) Systems standard of the Japanese Association of Radio Industries and Businesses.

Bluetooth units have general behaviors through which they communicate with other units. These behaviors are called "application profiles". There are 13 application profiles described in Version 1.1 of the specification, including the Generic Access Profile (GAP), Service Discovery Profile (SDP), Generic Object Exchange Profile (GOEP), and Object Push Profile.

The Generic Access Profile (GAP) defines how two Bluetooth units discover and establish a connection with each other. The service discovery protocol (SDP) defines the investigation of services available to a Bluetooth unit from other units. Generic Object Exchange Profile (GOEP) describes defines the set of protocols and procedures used by applications in handling object exchanges, e.g. File Transfer Synchronization using the Object Exchange (OBEX) Standard. The OBEX Standard is specified by the Infrared Data Association (IrDA), Object Exchange Protocol, Version 1.2. The OBEX Standard was adopted by Bluetooth as a binary HTTP protocol that allows multiple request/response exchanges. The Bluetooth Object Push Profile specification discusses the application of exchanging virtual business cards using the OBEX Standard.

Personal profiles are different from the official set of thirteen Bluetooth application profiles. Personal profiles are data sets intended to be exchanged between wireless mobile devices. Personal profiles provide information describing a user and his/her device to inform other users about the functionality and communication features of the user's device, and to inform about the characteristics and interests of the user. Currently, personal profiles are created by a user and sent to centralized servers operated by service providers for management and access by other users. What is needed is a mechanism or technique enabling a user to personalize his/her mobile, wireless terminal in real time to change and manage the personalization parameters at the terminal for sharing with other devices, such as in an ad hoc network.

Prior art related to personal profiles includes EP 1 130 869 A1 entitled "Management of User Profile Data" by D. Mandata, published Sep. 5, 2001, filed Mar. 1, 2000. This reference discloses an Instant Message Broker (IMB) System to allow messages to be sent in near real time between users. IMB is a distributed processing system that integrates network technologies, such as IP and Mobil Telecomm networks, allowing users to access functionality, accomplish tasks and deliver process information to called parties. IMB includes a database for storing and managing user profile data, which represents sets of user information/or user preferences concerning the terminal device users have access to within information transmission. The database comprises for each user at least one customizable user profile, which can be created, edited and/deleted by the user. Each customizable user profile is associated with an environment of the user representing a physical location and/or a logical context of the user. The database comprises a plurality of user profiles for one user, wherein only one user profile of a user is active at the same time. Each subscriber can have a plurality of user profiles in a so-called user space which is a subscriber's own data space as provisioned within the user profile database. Users can define different context for different situations and dynamically switch between them. The currently used active context describes how the subscriber can be reached. The description includes an indication whether the user is currently on-line on a preferred terminal device. In addition, a set of alternative terminal devices is provided where the IMB subscriber may be contacted or not reachable at the preferred device. The alternative terminal devices can also be used for receiving additional copies of instant messages.

The prior art does not describe or suggest a wireless, mobile terminal containing personalized user profiles that are installed, edited by and managed by the user on the user's mobile terminal. An example of a need for this capability is the real time modification of a sales representative's virtual business card to match the perceived interests of a potential customer. Currently, the sales representative cannot add or update the information in real time to his/her virtual business card. Another example of a need for this capability is in a dating/match-making scenario. During a chance meeting involving the exchange of virtual business cards, the user may wish to modify his/her personal interest information in real time, to match the perceived interests of the other user.

Still further, the prior art does not describe or suggest uploading the personalized user profiles from the user's wireless, mobile terminal to a server operated by service provider, for access by the user to update the profiles, and then return them to the user's wireless device.

SUMMARY OF INVENTION

To overcome limitations in the prior art described above, and to overcome other limitations that will be apparent upon reading and understanding the present specification, the present invention is directed to provide a method and an apparatus for sharing a user's Personal profile. A user's Personal profile is installed in a service discovery protocol (SDP) database of the user's Bluetooth mobile terminal, for sharing with inquiring Bluetooth mobile terminals in an ad hoc network. Changes to the Personal profile need only be entered once at the user's terminal. The user's Personal profile may be accessed by inquiring Bluetooth terminals when the user's terminal has its personal profile response state set to "ON". A standardized form of the user's Personal profile is built into the SDP records. The Personal profile includes a list of user interests defined by a plurality of fields, each field including a series of attributes, where each attribute is defined by a name, a type, and a value. Every specified interest of the user's has its own bit mask. The full complement of personalization data may be stored in one SDP record, provided that not too many attributes/bit masks are allocated in the record. Attributes/bit masks are allocated in the record using semicolons to separate names, types and values (e.g., NAME; STRING; Tomi Heinonen; AGE; INT; 33 . . . ) The user's mobile terminal provides processes for handling messages and personal profiles and also processes for filtering incoming messages. An index screen in the user's terminal enables the user to access a process screen for editing and removing keywords related to the processes. The editing and updating of Personal Profiles can be performed using the user interface of user's mobile terminal.

In an alternate embodiment, to accommodate a limited screen size in the user's mobile terminal, the editing of the Personal profiles and message filters may be made easier by performing that operation on a desktop computer. The Personal profiles can be uploaded via the Web and stored at a centralized database, enabling editing on the user's desktop computer. The updated Personal profiles can then be downloaded to the user's mobile terminal. The Personal profile updates may then be synchronized with the terminal profiles.

If the responding user's terminal has its personal profile response state set to "ON", then an inquiring terminal can make an SDP inquiry to request a Personal profile. The SDP inquiry accesses the responding user's terminal SDP database, which is divided into a phone book section containing the users personal profile and a more detailed data section for detailed personal information. The phone book section can contain "generic" information, e.g. name, gender, age, contact information, etc. The more detailed data section can include detailed personal profile information, such as sports interests, hobby interests, and so on. The responding user's terminal responds in an SDP transaction to provide a standardized format for the requested information. Additional references can also be included in the response, providing links to additional user defined information. If the inquiring terminal or client desires the additional user defined information, the inquiring client can retrieve the information from the SDP database in an object exchange (OBEX) transaction. In response, the inquiring client receives the user information from the user's phonebook. Typically, the user's phonebook is encoded in a format such as the vCard electronic business card format. The inquiring client also receives user defined Personal profiles encoded in extended markup language (XML).

In one aspect, whenever the user of the wireless terminal wants to provide his/her personal profile information to inquiring devices, the user sets the personal profile response state to "ON". This causes the user's wireless device to write into the class-of-device (CoD) field of its inquiry response packet, its status as having its personal profile available. The user's wireless terminal can be set by its user to indicate in its class-of-device (CoD) field of its inquiry response packet, that particular types of personal profile information are available, such as dating/match-making information. The inquiring device can be programmed by its user to recognize that particular class-of-device (CoD) and respond by browsing or searching the SDP service records of the user's wireless terminal.

The user's terminal, itself, may run SDP inquires to find other terminals supporting Personal profiles. When a connection is formed between the terminals, various services can be provided, including personalized, location dependent services, dating services, and the identification of profiles that match user defined criteria.

A feature of the invention is creating, editing and storing personal profiles of a user in a wireless, mobile terminal for sharing with other terminals in an ad hoc network in a short-range communication system.

Another feature of the invention is storing all personal profiles of a user in a single Service Discovery Protocol (SDP) record, the record containing contact information, standard format profiles of the user's interests, and user or manufacturer defined information.

Still another feature of the invention is uploading personal profiles from the user's mobile terminal and storing them at a service provider's server that is accessible from a desktop computer, to enable the user to conveniently edit and update the profiles using the desktop computer, and then to return the updated personal profiles to the user's mobile terminal.

In an alternate embodiment of the invention, a push-mode enables the user's terminal to broadcast user profile information.

In another alternate embodiment of the invention, the user's short-range wireless terminal can share information in its personal profile with the inquiring wireless terminal, if their respective user profiles match within a predefined tolerance.

In another alternate embodiment of the invention, the user's short-range wireless terminal can share the general information portion of his/her local user profile with another short-range wireless terminal, if their respective user profiles have a first level of close matching. If their respective user profiles have a second level of closer matching, the two terminals can further share more detailed information in their respective user profiles.

In another alternate embodiment of the invention, a server can provide matchmaking services via Bluetooth links by registering users of devices. Registration can include checking user qualifications for matchmaking, such as being above a certain age. Then, when the two respective registered users try to exchange privacy sensitive information without having to actually engaged in a conversation with each other, they link to the server, which delivers the same PIN to both devices, thereby enabling the Bluetooth Authentication procedure to run automatically in the background for both devices.

DESCRIPTION OF THE DRAWINGS

The invention will be further understood from the followed description of a preferred embodiment taken in conjunction with the appended drawings.

FIG. 3A is a representation of a typical user personal profile formatted in a bit mask, as one embodiment, in the user's terminal 101 of FIG. 1.

FIG. 4A is a representation of a text-encoded vCard format available in the contact information part 301 of Table A.

FIG. 4B is a representation of an XML encoded non-standard profile available in the SDP record of Table A.

FIG. 5 describes a method for creating and editing personal profiles, according to one embodiment of the present invention.

FIG. 6 describes a method for filling out profiles of FIG. 3A for entry in the SDP records of Table A.

FIG. 7 describes a method for accessing a personal profile of the user terminal with user profile support in the ad hoc network of FIG. 1.

FIG. 10 is a network process diagram of the embodiment of FIG. 9, adding authentication between the two Bluetooth devices.

DESCRIPTION OF PREFERRED EMBODIMENT

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
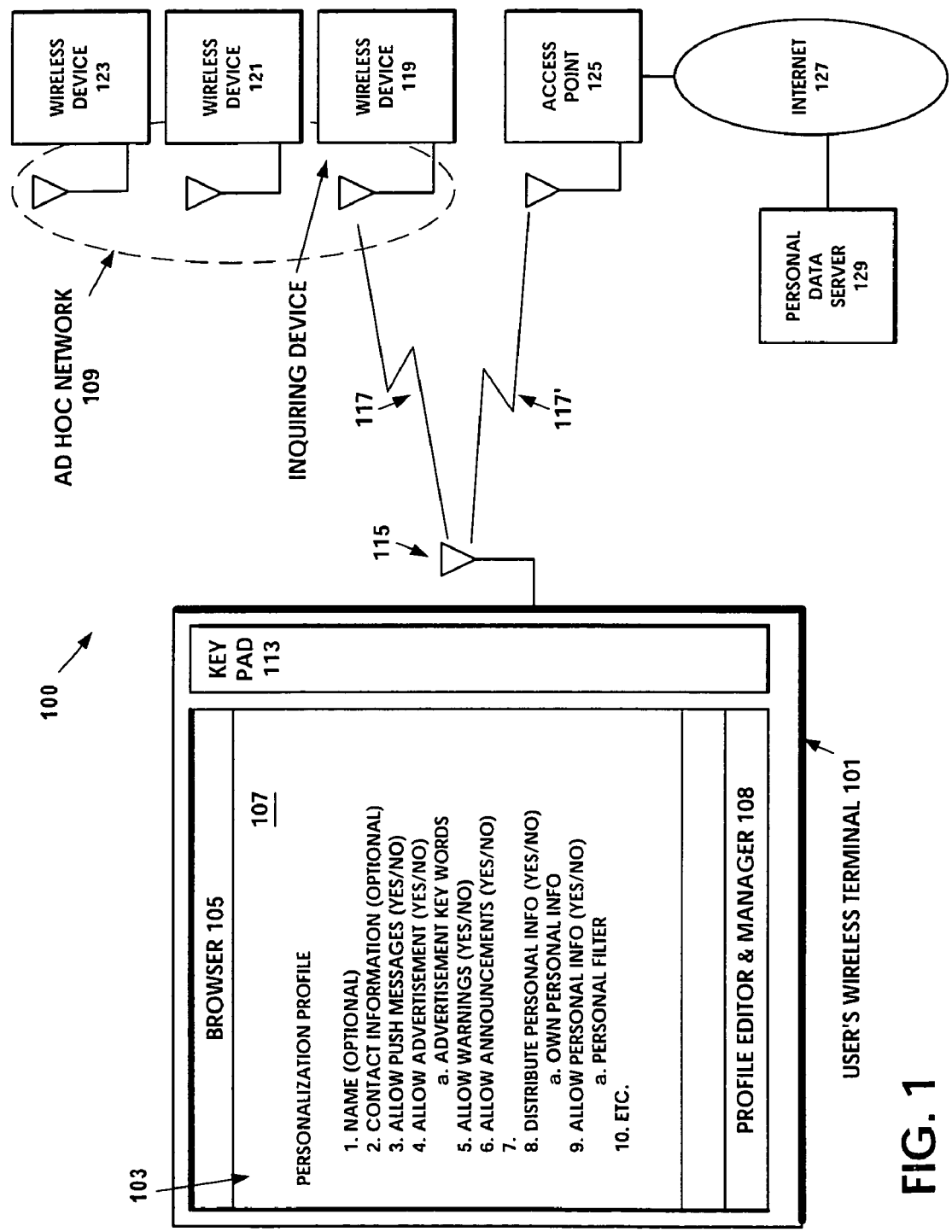
FIG. 1 is a representation of a user terminal or wireless device in an ad hoc network, incorporating the principles of the present invention.

FIG. 1 discloses a system 100, which provides personal profile sharing for wireless, mobile terminals in ad hoc networks. A user's terminal 101, typically a Bluetooth device, includes a memory 103 storing a browser 105, an operating system (not shown), a profile editor and manager 108, and a personal profile 107 indicating the user's interests or receiving queries from other terminals in an ad hoc network 109. The user's terminal 101 includes a display, a keypad 113 and an antenna 115 for sending and receiving signals 117 to other Bluetooth devices 119, 121 and 123 in a short-range communication system. Antenna 115 also sends and receives signals 117' with an access point 125 linked to by a network 127, e.g. the Internet, to a personal data server 129 operated by a service provider. The following description is provided for the terminals or wireless devices in the system 100 implemented as Bluetooth devices. However, the terminals or wireless devices in the system 100 can also be implemented in other wireless standards such as the IEEE 802.11 Wireless LAN standard and the HIPERLAN standard.

A connection between two Bluetooth devices is initiated by an inquiring device sending out an inquiry message containing an inquiry access code (IAC), searching for other devices in its vicinity. Any other Bluetooth device that is listening for an inquiry message containing the same inquiry access code (IAC), by means of conducting an inquiry scan, will recognize the inquiry message and respond. The inquiry response is a message packet containing the responding device's Bluetooth Device Address (BD_ADDR). A Bluetooth device address is a unique, 48-bit IEEE address, which is electronically engraved into each Bluetooth device.

The inquiring device uses the information provided in the inquiry response packet, to prepare and send a paging message to the responding device. To establish a connection, the inquiring device must enter the page state. In the page state, the inquiring device will transmit initial paging messages to the responding device using the device access code and timing information acquired from the inquiry response packet. The responding device must be in the page scan state to allow the inquiring device to connect with it. Once in the page scan state, the responding device will acknowledge the initial paging messages and the inquiring device will send a paging packet, which provides the clock timing and access code of the inquiring device to the responding device. The responding device responds with a page acknowledgment packet. This enables the two devices to form a connection and both devices transition into the connection state. The inquiring device that has initiated the connection assumes the role of a master device and the responding device assumes the role of a slave device in a new ad hoc network.

Each ad hoc network has one master device and up to seven active slave devices. All communication is directed between the master device and each respective slave device. The master initiates an exchange of data and the slave responds to the master. When two slave devices are to communicate with each other, they must do so through the master device. The master device maintains the ad hoc network's network clock and controls when each slave device can communicate with the master device. Members of the ad hoc network join and leave as they move into and out of the range of the master device. Ad hoc networks support distributed activities, such as collaborative work projects, collaborative games, multi-user gateways to the Internet, and the like. A user's device that joins a particular ad hoc network, does so to enable its user to participate in the currently running collaborative activity.

Figure 2:
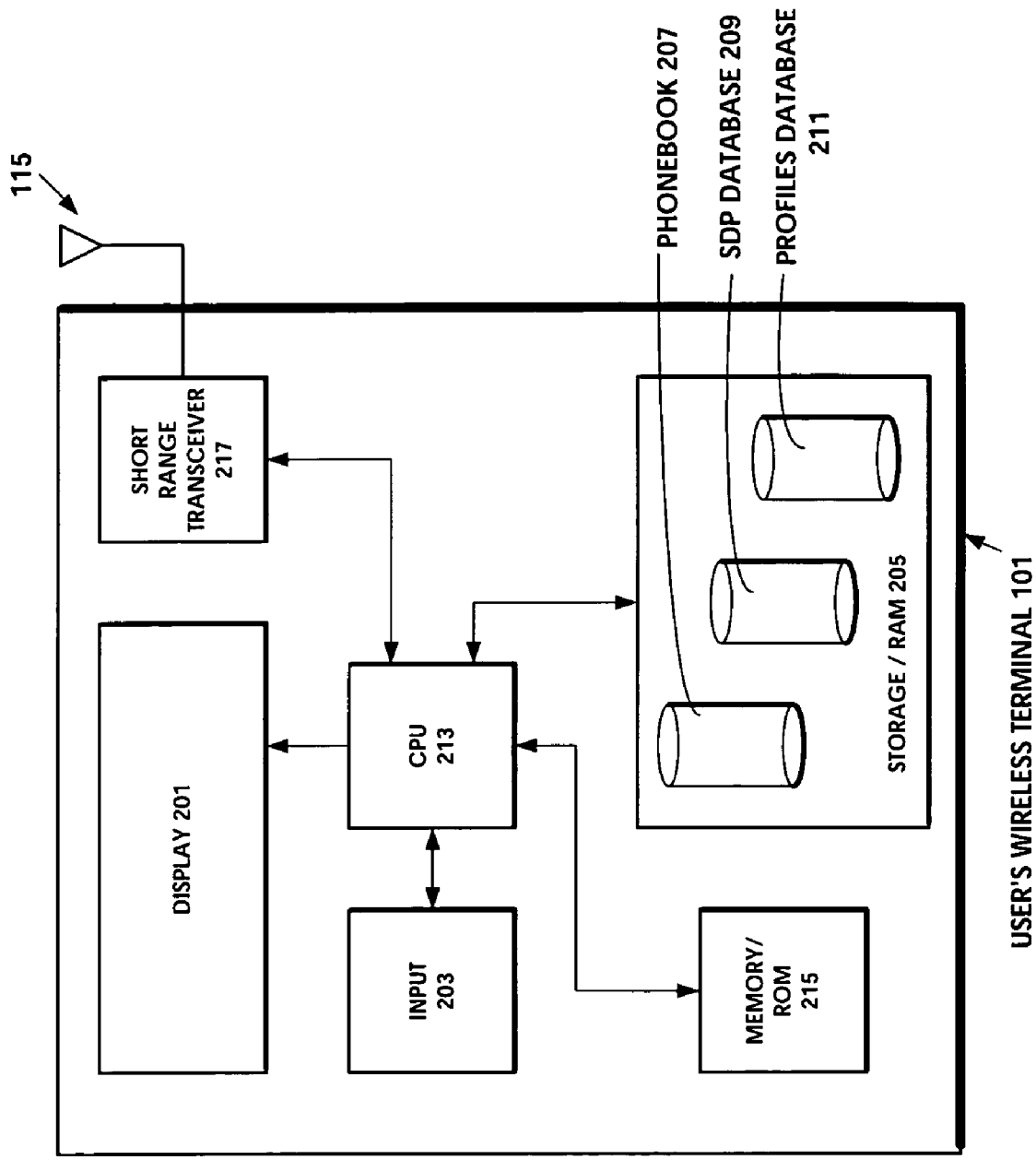
FIG. 2 is a representation of one embodiment of an internal architecture for the user terminal of FIG. 1.

FIG. 2 discloses one embodiment of the user's terminal 101. Included in the terminal 101 is a display 201 for displaying messages received from the access point 127 and the other terminals 119, . . . 123 in a piconet, e.g. the ad hoc network 109, where the terminal 119 may serve as an inquiring device. An input device 203 such as the key pad 113, enables the user to enter data for transmission to the access point or other terminals. Input device 203 enables the user to input changes to the user's personal profiles stored in a storage area 205, including phone book information 207, Service Discovery Database 209, and a Personal profile database 211. A CPU 213 is connected to both the input 203, the storage devices 205, and to a memory 215 containing an operating system (not shown) and protocol for the Bluetooth connection/disconnection processes described above. A short-range transceiver 217 is linked to the antenna 115 for sending and receiving signals to the devices 119, 121 and 123 and to the access point 125.

In the ad hoc network 109 of FIG. 1, the inquiring device 119 sends inquiries to other Bluetooth devices in the area, such as the user's terminal 101. The inquiring device 119 periodically transmits inquiry packets. The general inquiry access code (GIAC) of the packet is recognized by all Bluetooth devices as an inquiry message. During the inquiry procedure, any other Bluetooth devices that are in the inquiry scan state, such as the user's terminal 101, are scanning for the receipt of inquiry packets. If the user's terminal 101 in the inquiry scan state receives the inquiry packet with a matching IAC, it will respond with an inquiry response packet that has sufficient information to enable the inquiring device 119 to build its inquiry response table of essential information required to make a connection. Any Bluetooth device recognizing the inquiry packet can respond. The inquiring device 119 can now initiate a connection with the user's terminal 101. The inquiring device 119 uses the information provided in the inquiry response packet, to prepare and send a paging message to the user's terminal 101. To establish a connection, the inquiring device 119 must enter the page state, where it will transmit paging messages to the user's terminal 101 using the access code and timing information acquired from the inquiry response packet. The user's terminal 101 must be in the page scan state to allow the inquiring device 119 to connect with it. Once in the page scan state, the user's terminal 101 will acknowledge the paging messages and the inquiring device 119 will send a paging packet, which provides the clock timing and access code of the inquiring device 119 to the user's terminal 101. The user's terminal 101 responds with a page acknowledgment packet. This enables the two devices to form an asynchronous connection-less (ACL) link and both devices transition into the connection state.

The inquiring device 119 can then send to the user's terminal 101, a Service Discovery Protocol (SDP) search request packet. The SDP Request packet carries the SDP Service Search Attribute Request which includes a service search pattern and an attribute ID list. The service search pattern is the description of the pattern for the user's terminal 101 to match in the service registry of its SDP database 209. If the user's terminal 101 has the service requested, it responds with the service's handle. The service handle identifies the service for which the attributes are being requested. The attribute ID list identifies the attributes that the inquiring device 119 is requesting.

The SDP service registry in the SDP database 209 stores service records in a browsing hierarchy. The service records are arranged into a hierarchy structured as a tree that can be browsed. The inquiring device 119 can begin by examining the public browse root, and then follow the hierarchy out to service classes which are the branches of the tree, and from there to the leaf nodes, where individual services are described in service records. To browse service classes or to get specific information about a service, the inquiring device 119 and the user's terminal 101 exchange messages carried in SDP packets. There are two types of SDP packets, the SDP Service Search Attribute Request packet and the SDP Service Search Attribute Response packet. The SDP Request packet carries the SDP Service Search Attribute Request, which includes a service search pattern and an attribute ID list. The service search pattern is the description of the pattern for the user's terminal 101 to match in its SDP service registry in the database 209. If the user's terminal 101 has the service requested, it responds with the service's handle. The service handle identifies the service for which the attributes are being requested. The attribute ID list identifies the attributes that the inquiring device 119 is requesting. The SDP response packet returned by the user's terminal 101 carries the SDP Service Search Attribute Response which includes a service record handle list and the attributes. The service record handle list and the attributes are then examined by the inquiring device 119.

As described above, an inquiry response packet from the user's wireless terminal 101, has sufficient information to enable the inquiring device 119 to build an inquiry response table of essential information required to make a connection. The Bluetooth frequency hop synchronization (FHS) packet structure for an inquiry response packet sent by the user's wireless terminal 101, includes a class-of-device (CoD) field. In one aspect of the invention, whenever the user of the wireless terminal 101 wants to provide his/her personal profile information to inquiring devices, the user sets the personal profile response state to "ON". This causes the user's wireless device 101 to write into the class-of-device (CoD) field of its inquiry response packet, its status as having its personal profile available.

The inquiring device 119 constructs the inquiry response table with the information in the inquiry response packets received from responding devices, such as the user's wireless terminal 101. The inquiry response table shows the essential information gathered by the link controller in the inquiring device 119, which is needed to make a connection with any of the responding wireless devices. In this aspect of the invention, any responding devices are flagged, such as the user's wireless terminal 101, that have a class-of-device (CoD) field with the status of having its personal profile available.

There are several options that can be programmed in the inquiring device 119, for processing the data gathered in the inquiry response table. The inquiring device 119 can be programmed to determine whether the class-of-device (CoD) field for a responding device has the status of having its personal profile available. If so, then the inquiring device 119 can browse or search the SDP service records of the user's wireless terminal 101, since it is now known that they have personal profile information available. Since an analysis of the class-of-device (CoD) field only requires the receipt of an inquiry response packet, and does not require the completion of a connection between the two devices, this option provides a quick search of responding devices. The inquiring device 119 can provide to its user a "QUICK SEARCH" option in its initial logon menu, which can invoke the process to check the data gathered in the inquiry response table to determine whether the class-of-device (CoD) field for any responding device has the status of having its personal profile available. This implementation is optional.

The inquiring device 119 can be programmed to determine whether the class-of-device (CoD) field for a responding device, such as the user's wireless terminal 101, has a specific type of personal profile information specified in the class-of-device (CoD) field. The inquiring device 119 can match it with an entry in a search options list table in the inquiring device 119. For example, the user's wireless terminal 101 can be set by its user to indicate in its class-of-device (CoD) field of its inquiry response packet, that a dating/match-making personal profile is available. The inquiring device 119 can be programmed by its user to recognize that particular class-of-device (CoD) and respond by browsing or searching the SDP service records of the user's wireless terminal 101. The inquiring device 119 can be programmed for optional special processing of the SDP service records with dating/match-making personal profile information from the user's wireless terminal 101.

Figure 3B:
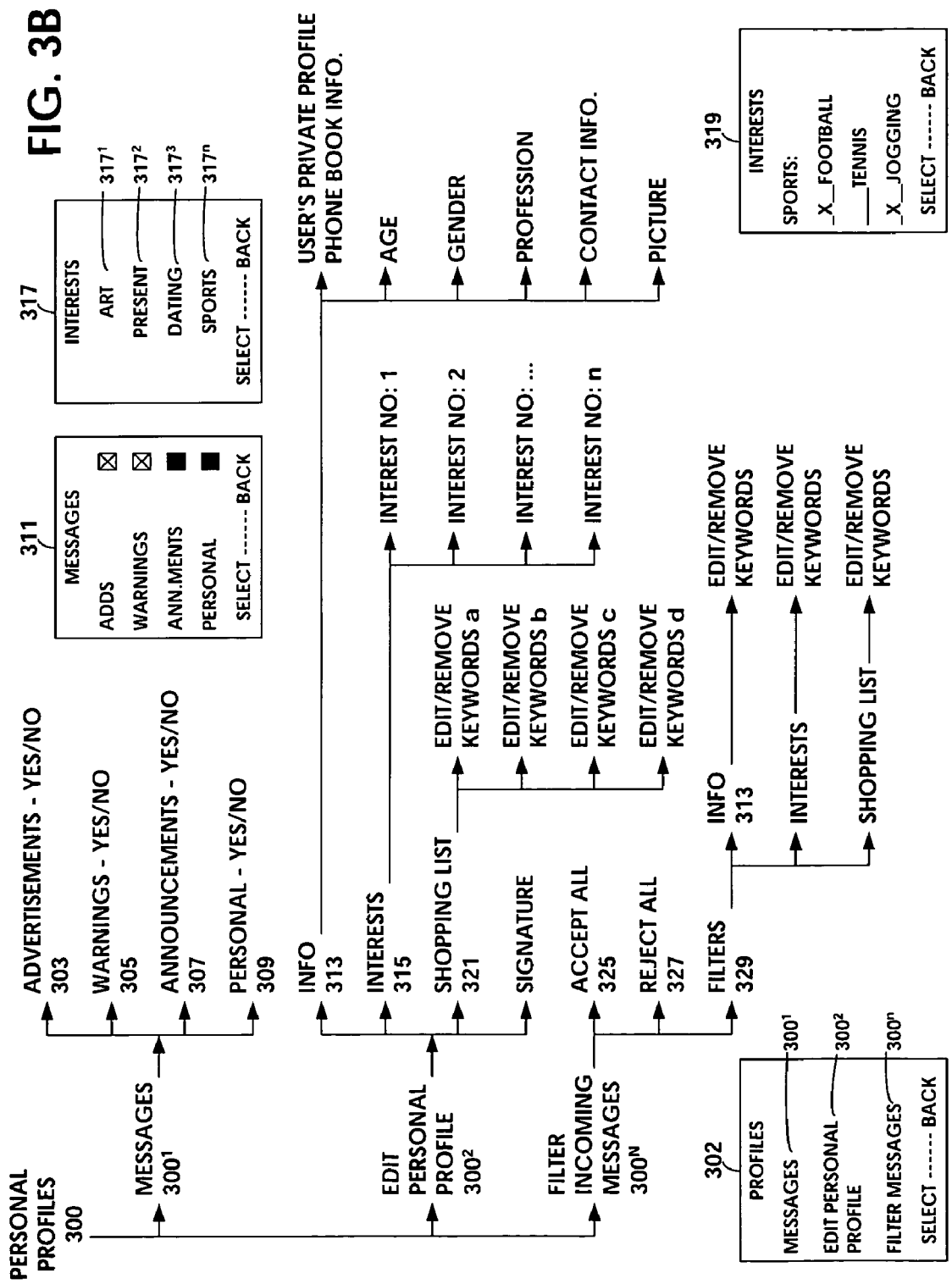
FIG. 3B is a detailed representation of the user personal profile of FIG. 3A for the user's terminal 101 of FIG. 1. The terminal screens 302, 311, 317, 319 show the display on the user's terminal 101, of the profile items and categories.

FIG. 3A is an overview of a typical user profile 300 stored in memory 215 (FIG. 2) as a record and including contact information 301 having a pointer to an entry in the phonebook 207 (FIG. 2) for responding to queries from another user in the ad hoc network. The profile 300 further includes a standardized profile part 304 defining the user's personal information, interest and other matters, as will be described in more detail in connection with FIG. 3B. In one embodiment, the record may include a plurality of "bit masks" $306^1 \ldots 306^N$, where the plurality is an integer "N". Each bit mask contains two bytes representing a profile, where byte 308 identifies the profile in part 304 and byte 310 enables the user to characterize the content of that profile. The profile may be characterized, in one embodiment by identifying the qualities of the profile using binary 1s (illustrated by filled circles) and binary 0s (illustrated by empty circles) to indicate yes/no choices, respectively or vice versa. There can be bit mask values that are assigned by convention to indicate generic interests such as art, dating, and sports. The bit masks 306 can be used to facilitate the user's selection of one profile among many profiles that the user has stored in the SDP database 209. The bit masks can also be used to facilitate communication with the inquiring device 119. The inquiring device 119 can retrieve a bit mask 306 in an SDP response packet returned by the user's terminal 101. The SDP response packet carries the SDP Service Search Attribute Response which includes the bit mask. The bit mask can then be examined by the inquiring device 119, comparing its value with reference bit mask values indicating the generic interests.

Profile 300 of FIG. 3A further includes user and/or manufacturer defined profile part 312 represented by a datastream 314, including a user identification field 316 having a plurality of 3-part sub-fields $318^1$, $318^2$, to $318^n$, where the plurality is an integer "n". Each subfield contains a name portion 320 identifying a user or a manufacturer associated with the terminal, a format portion 322 defining specific information related to the name or the manufacture, and a value portion 324 providing a code representing the specific information related to the user or manufacturer. The datastream 314 can be used to facilitate the user's selection of one profile among many profiles that the user has stored in the SDP database 209. The datastream 314 can also be used to facilitate communication with the inquiring device 119. The inquiring device 119 can retrieve a datastream 314 in an SDP response packet returned by the user's terminal 101. The SDP response packet carries the SDP Service Search Attribute Response which includes the datastream 314. The datastream 314 can then be examined by the inquiring device 119.

FIG. 3B shows a more detailed view of the personal profile 300 comprising a plurality of sub-profiles. A sub-profile $300^1$ defines message processing. A sub-profile $300^2$ provides editing of personal profiles related to user information, interests, etc. A sub-profile $300^N$ provides processes for filtering messages received from users on the ad hoc network. Each sub-profile includes a list of user interests defined by a plurality of fields, each field including a series of attributes, where each attribute is defined by a name, a type and a value.

The sub-profile $300^1$ in FIG. 3B, sorts received messages that are received from the ad hoc network or access point into advertisements 303, warnings 305, announcements 307, and personal messages 309. Using the Platform For Interconnect Content Selection (PICS) Rules, published at http://www.w3.org/PICS, a screening program that provides an indicator describing the content of each message. The indicator is recognized by the sub-process and accepted or rejected according to the user's interest as inputted via a screen 311 in FIG. 3B. The user clicks on the messages to be rejected and allows the other messages to be processed for display to the user. The screen 311 permits the user to change message selections at any time, without changing the records in the personal data server 129 (see FIG. 1) at anytime, thereby enabling the personal profile to be current with the users messages interest.

A sub-profile $300^2$ in FIG. 3B, enables the user to install and edit user's private profile information, including phone book information related to age, gender, profession, contact information, picture and other related information that the user wishes to make available to other users in the ad hoc network. Also included in the sub-profile $300^2$ are the user's interest 315, which may be in different categories indicated in a screen 317 in FIG. 3B. The categories include, for example, Art, Present, Dating, and Sports. Each interest is further expanded in a screen 319 in FIG. 3B, listing specific interest in a category.

The sub-profile $300^2$ in FIG. 3B, further includes a shopping list 321 for different merchants, A, B, C, D, each list including key words or merchandise in which the user has an interest as described in an accompanying sub-screen (not shown). The sub-screen allows the user to edit or delete from the contents in the shopping list.

The sub-profile $300^2$ in FIG. 3B, may also include a digital signature, which can be generated by the user in the event that merchandise is ordered and payment is required by the merchandiser. Digital signatures and their protection are described in the text *Applied Cryptography* by B Schneier, published by John Wiley & Sons, New York, N.Y., Part 2.6, ISBN 0-471-12845-7), 1996

Responsive to screen 302 in FIG. 3B, the sub-profile $300^n$ filters user profiles. The sub-profile $300^n$ enables the user to establish a state 325 "accepting all messages", or alternately a state 327 "rejecting all messages", or alternately a state 329 "filtering all messages". This is accomplished using the PICS rules related to user information 313, or using user interests 315, or using shopping list 321. This provides the ability to allow the user to edit/remove keywords filtering the messages.

TABLE A

FORMATTING OF ALL USER PROFILES IN ONE SDP RECORD 400

| | A | B | C | D | E | F | G | H |
|---|---|---|---|---|---|---|---|---|
| 1 | UserInformation | | | | | | | |
| 2 | | Contact Info | | | vCard String | | | |
| 3 | UserProfile ID | List | | | List of Profiles | | | |
| 4 | | UserProfileID1 | | | UserProfile 1 | UUID | | |
| 5 | | | Version | | Profile version | Unit 16 | 0x0100 | |
| 6 | | | Profile Filter | bitmask | | | | |
| 7 | | UserProfileID2 | | | UserProfile 2 | UUID | | |
| 8 | | | Version | | Profile version | Unit 16 | 0x0100 | |
| 9 | | | Profile Filter | bitmask | | | | |
| 10 | | UserProfileIDn | | | UserProfile n | UUID | | |
| 11 | | | Version | | Profile version | Unit 16 | 0x0100 | |
| 12 | | | Profile Filter | bitmask | | | | |
| 13 | UserDefined | ProfileIDList | | | | | | |
| 14 | | Profile ID 1 | | | SupportProfile | UUID | | |
| 15 | | | FieldName | ProfileVersion | String | | | |
| 16 | | | FieldType | ProfileVersion | Unit 8 | | | |
| 17 | | | FieldValue | ProfileVersion | varies | | | |
| 18 | | Profile ID 2 | | | SupportProfile | UUID | | |
| 19 | | | FieldName | ProfileVersion | String | | | |
| 20 | | | FieldType | ProfileVersion | Unit 8 | | | |
| 21 | | | FieldValue | ProfileVersion | varies | | | |
| 22 | | Profile ID 3 | | | SupportProfile | UUID | | |
| 23 | | | FieldName | ProfileVersion | String | | | |
| 34 | | | FieldType | ProfileVersion | Unit 8 | | | |
| 25 | | | FieldValue | ProfileVersion | varies | | | |
| | A | B | C | D | E | F | G | H |

Table A is a representation of user personal profiles formatted in one SDP record, including contact information, standard user profiles and user and/or manufacturing profiles Table A shows all user profiles formatted in one Service Discovery Protocol (SDP) record 400 stored in the SDP database 209 (FIG. 2). Table A is organized into eight columns labeled "A" through "H" and into 25 rows labeled "1" through "25". The record 400 shown in Table A includes the contact information part 301 shown in rows 1 and 2, standardized profile part 304 shown in rows 3 through 12, and user and/or manufacturer defined profile part 312 shown in rows 13 through 25.

The contact information part 301 of Table A includes a vCard string shown in Table A at columns E and F, row 2, the contents of which appear in FIG. 4A. FIG. 4A is a representation of a text-encoded vCard format 401 available in the contact information part 301 of Table A. The contact information part 301 includes the name of the individual, telephone for both voice and fax. vCards are an electronic business card for Personal Data Interchange. The vCard facilitates various data interchanges including exchanging business cards, Internet mail, computer/telephone applications and video and data conferencing. The Card is described in the vCard V2.1 specification published by the Internet Mail Consortium at http://www.imc.org/pdi/vcardoverview.html. The Internet Engineering Task force (IETF) has released the specification for vCard version 3. The two parts of the definition are: RFC 2425, MIME Content-Type for Directory Information and RFC 2426, vCard MIME Directory Profile. In the future, other formats may replace the vCard, such as XML formats based on DTDs.

The standardized profile part 304 of Table A shown in rows 3 through 12, includes User ProfileID lists, such as User ProfileID #1 shown in Table A at column B and C, row 4, and User ProfileID #2 shown in Table A at column B and C, row 7, up to User ProfileID # n shown in Table A at column B and C, row 10. Each User ProfileID profile includes a Version Number shown in Table A at column C, row 5, a profile filter shown in Table A at column C, row 6, a record, e.g. a bit mask shown in Table A at column D, row 6, a UUID shown in Table A at column E, row 4, and a bit mask code shown in Table A at column F, row 5, as represented by reference 306[1] in FIG. 3A.

The User/Manufacturer Defined Profile Part 312 of Table A shown in rows 13 through 25, includes a plurality of Profile IDs shown in Table A at column B, rows 14, 18, and 22. The Profile IDs are each identified by a UUID shown in Table A at column E, row 14, and including a field name shown in Table A at column C, row 15, a field type shown in Table A at column C, row 16 and a field value shown in Table A at column C, row 17 as described in conjunction with reference 314 of FIG. 3A. Each field is associated with a Profile Version shown in Table A at column D, row 15 defined by a bit string shown in Table A at column E, row 15 for the name, a descriptor shown in Table A at column E, row 16 for the format and a parameter shown in Table A at column E, row 17, which varies for the value.

Non-standard profiles 450, as shown in FIG. 4B, may be prepared and included in the SDP record. FIG. 4B is a representation of an XML encoded non-standard profile available in the SDP record of Table A. Each non-standard profile may be XML encoded defining the Document Type, Element and User Profile Version, which track the information content of the standardized profiles 304. The XML program, Version 1.9 is described in the W3C recommendation of February 1998.

TABLE B

FORMATTING THE USER PROFILES IN ONE SDP RECORD 400
WITH POINTERS TO THE PHONE BOOK AND PROFILES DATABASE

| | A | B | C | D | E | F | G | H |
|---|---|---|---|---|---|---|---|---|
| 1 | UserInformation | | | | | | | |
| 2 | | Index | | Index of the vcard of the user in the PhoneBook | Unit8 | | | |
| 3 | UserProfile ID | List | | List of Profiles | | | | |
| 4 | | UserProfileID1 | | UserProfile 1 | UUID | | | |
| 5 | | | Version | Profile version | Unit 16 | 0x0100 | | |
| 6 | | | Profile Filter | bitmask | | | | |
| 7 | | UserProfileID2 | | UserProfile 2 | UUID | | | |
| 8 | | | Version | Profile version | Unit 16 | 0x0100 | | |
| 9 | | | Profile Filter | bitmask | | | | |
| 10 | | UserProfileIDn | | UserProfile n | UUID | | | |
| 11 | | | Version | Profile version | Unit 16 | 0x0100 | | |
| 12 | | | Profile Filter | bitmask | | | | |
| 13 | UserDefined | ProfileIDList | | | | | | |
| 14 | | Profile ID 1 | | Index in the Profiles DB | Unit8 | | | |
| 15 | | Profile ID 1 | | Index in the Profiles DB | Unit8 | | | |
| 16 | | Profile ID 1 | | Index in the Profiles DB | Unit8 | | | |
| | A | B | C | D | E | F | G | H |

Table B is a representation of the user profiles of FIG. 3A, formatted in one Service Discovery Protocol (SDP) record in SDP database 209, with pointers to the Phone book 207 and Profiles database 211. Table B is organized into eight columns labeled "A" through "H" and into 16 rows labeled "1" through "16". The record 400 shown in Table B includes the contact information part 301 shown in rows 1 and 2, standardized profile part 304 shown in rows 3 through 12, and user and/or manufacturer defined profile part 312 shown in rows 13 through 16. Table B shows user profiles 400 formatted in one SDP record with pointers to the phonebook database 207 and profile database 211 (See FIG. 2) in the user's terminal 101. The contact information part 301 of Table B includes an index shown in Table B at column B, row 2 of the vCards in the phone book 313 (FIG. 3B). The standard profile's part 304 of Table B includes a list shown in Table B at column D, row 3 of user profile IDs, as described in Table A. The user and/or manufacturer defined profiles 312 of Table B include an index shown in Table B at column D, row 14, list of profile IDs, as described in Table A. A user may use the index shown in Table B at column B, row 2, the list shown in Table B at column D, row 3 and the index shown in Table B at column D, row 14, to point to the profile in the SDP database 209 shown in FIG. 2.

FIG. 5 in conjunction with FIG. 2, describes a process 700 for creating and editing profiles in the user's mobile terminal 101. In step 701, the process starts and the phone book database 207 is entered in step 702. A phonebook editing menu (not shown) stored in the memory 215, is activated to input the user's contact information in step 703. The contact information, in one embodiment, includes age, gender, profession and other details as indicated in FIG. 3B. A test is made to determine whether the profiles database 211 should be entered in step 705. A "no" condition exits the phone book and the editing menu in step 707. A "yes" condition activates a profile editing menu (not shown), stored in the memory 215 for preparing a standardized profile 400 in step 709 for storing as an OBEX file in the profile database 211. In step 711, a profile is chosen to fill out among a number of available profiles related to interest, shopping lists, etc. In step 713, the process transfers to entry point A in FIG. 6 if the user wishes to complete the profile. Otherwise, step 721 determines the user interest in completing other profiles. A "yes" selection returns the process to step 711 and 713. A "no" selection exits the profile-editing menu in step 731 and the process ends in step 733.

In FIG. 6, a test is made in step 715 to determine whether the profile is standard format or not. A "yes" condition initiates step 717 whereby the profile items and categories are displayed on the terminal screens 302, 311, 317, 319 and the like described in FIG. 3B. The relevant items are selected in step 719 to complete the profile, which is stored as an SDP service record in the SDP database 209 or as an OBEX file in the profiles database 211. In step 729 the user is queried to determine interest in completing other profiles. A "yes" selection transfers the process to entry point B in FIG. 5 for repeat of steps 711 and 713. A "no" selection transfers the process to entry point C in FIG. 5, where the profile editing menu is exited in step 731.

In FIG. 6, if the user wishes to enter a non-standard profile in either the SDP database 209 or the profile database 211, e.g. a User/Manufacturer Defined Profile 312 (FIG. 3A), step 722 is performed to assign a name to the profile. A name or format assigned is assigned to the item in step 724 and a value is assigned to the item in step 725. A test 728 is performed to determine if additional items are to be defined. A "yes" selection returns the process to step 724. A "no" selection transfers the process to step 729 where a "yes" selection returns the process to entry point B and steps 711, 713 in FIG. 5, as previously described in FIG. 5. A "no" selection returns the process to entry point C in FIG. 5, as previously described.

FIG. 7 describes a process 800 for an inquiring Bluetooth terminal or Access Point 801, such as the inquiring device 119 of FIG. 1, to access the personal profile of the user's Bluetooth Terminal 803, such as the user's wireless terminal 101 of FIG. 1, having user profile support, using the Bluetooth packet structure and SDP Service Search Request format. In step 805, the inquiring terminal 801 transmits a user Bluetooth inquiry 805 and the user 803 responds with an inquiry response 807. The inquiring terminal 801 sends an SDP inquiry in step 809 to determine whether the user's terminal support's user personal profiles. In step 811, the user 803 provides an SDP inquiry response indicating that the personal profiles are available. The inquiring terminal 801 reads all or part of the profiles and submits multiple SDP inquiries, if necessary, in step 813. The user 803 responds to the SDP inquiries in step 815. The inquiring terminal 801 retrieves more detailed contact information profiles, not available to SDP, by means of an OBEX request 817 using object exchange protocols. Object exchange (OBEX) protocols are described in the Infrared Data Association, Version 1.2, PO Box 3883, Walnut Creek, Calif. USA 94958. Multiple OBEX requests 817 may be made by the inquiring terminal 801 and the user 803 provides OBEX responses to the requests in step 819, after which the process ends.

Figure 8:
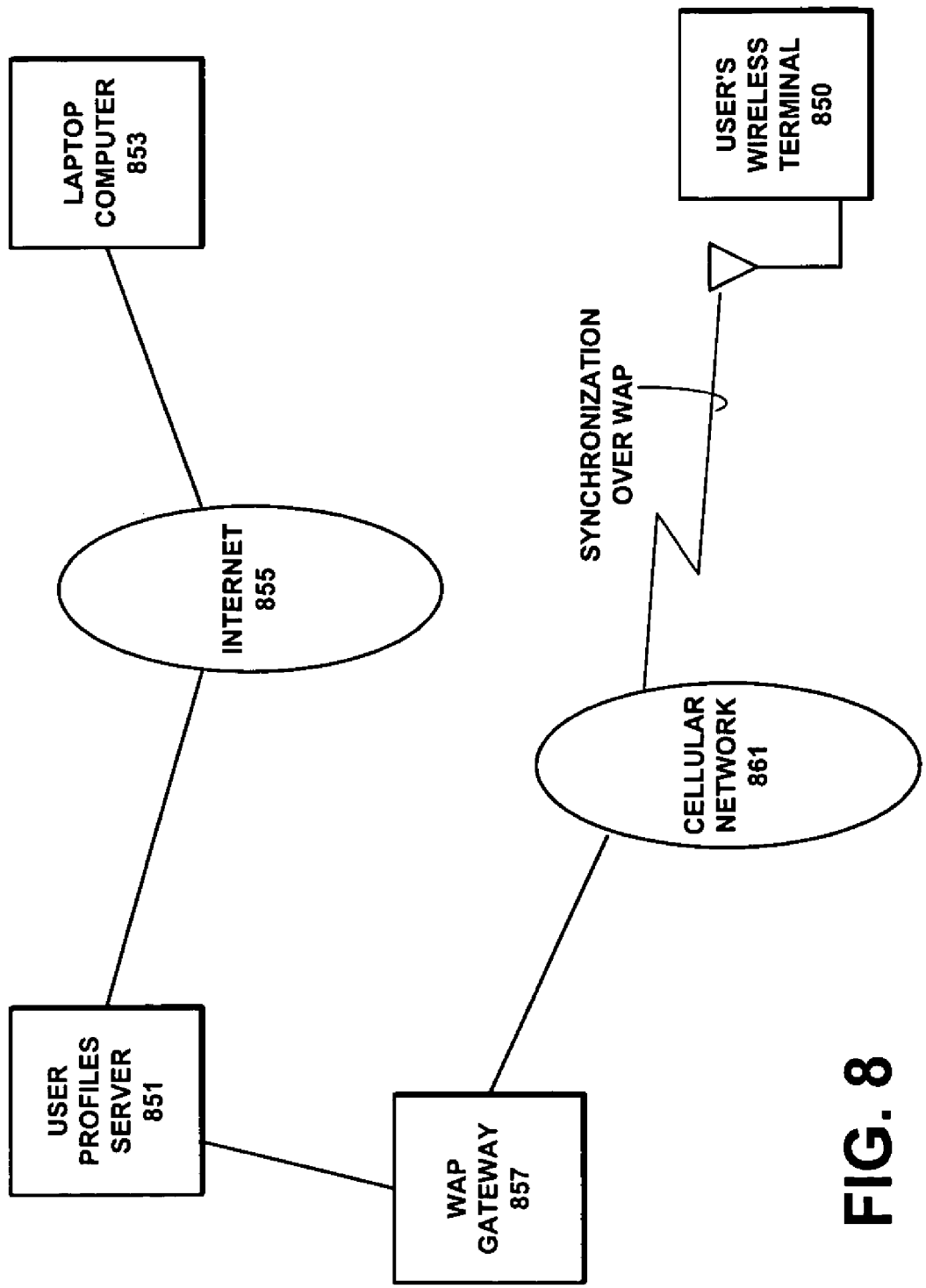
FIG. 8 describes an alternative embodiment for storing user profiles outside the user's mobile terminal 900.

FIG. 8 describes an alternative embodiment for storing user profiles outside the user's mobile terminal 850. The profiles may be stored in a user profile server 851 linked to the desktop computer or laptop 853 via Internet 855. The user may use the desktop computer or laptop 853 to create, edit and alter profiles in the profile server. The user's mobile terminal 850 has access to the profile server 851, via a Wireless Application Protocol (WAP) gateway 857, serving a cellular telephone network 861 to which the mobile terminal 850 has access. The gateway implements the Wireless Application Protocol supported by and available from the WAP Forum. Any Bluetooth inquiries for personal profiles can be sent to the user profile server 851, via the WAP gateway linked to the Internet for accessing the user profile server. The profiles are downloaded to the user's mobile terminal 850 for response to inquiries from other terminals in an ad hoc network. Storing the personal profiles in the server 851 reduces the storage load on the phone book, SDP, and profile databases in the user's mobile terminal shown in FIG. 2.

The resulting invention enables the user of a wireless, mobile terminal to install a personalized user profile in his/her terminal and to update that profile in real time. For example, the invention enables a sales representative to update his/her virtual business card in real time to match the perceived interests of a potential customer. As another example in a dating/match-making scenario, during a chance meeting involving the exchange of virtual business cards, the user may can modify his/her personal interest information in real time, to match the perceived interests of the other user.

Figure 9:
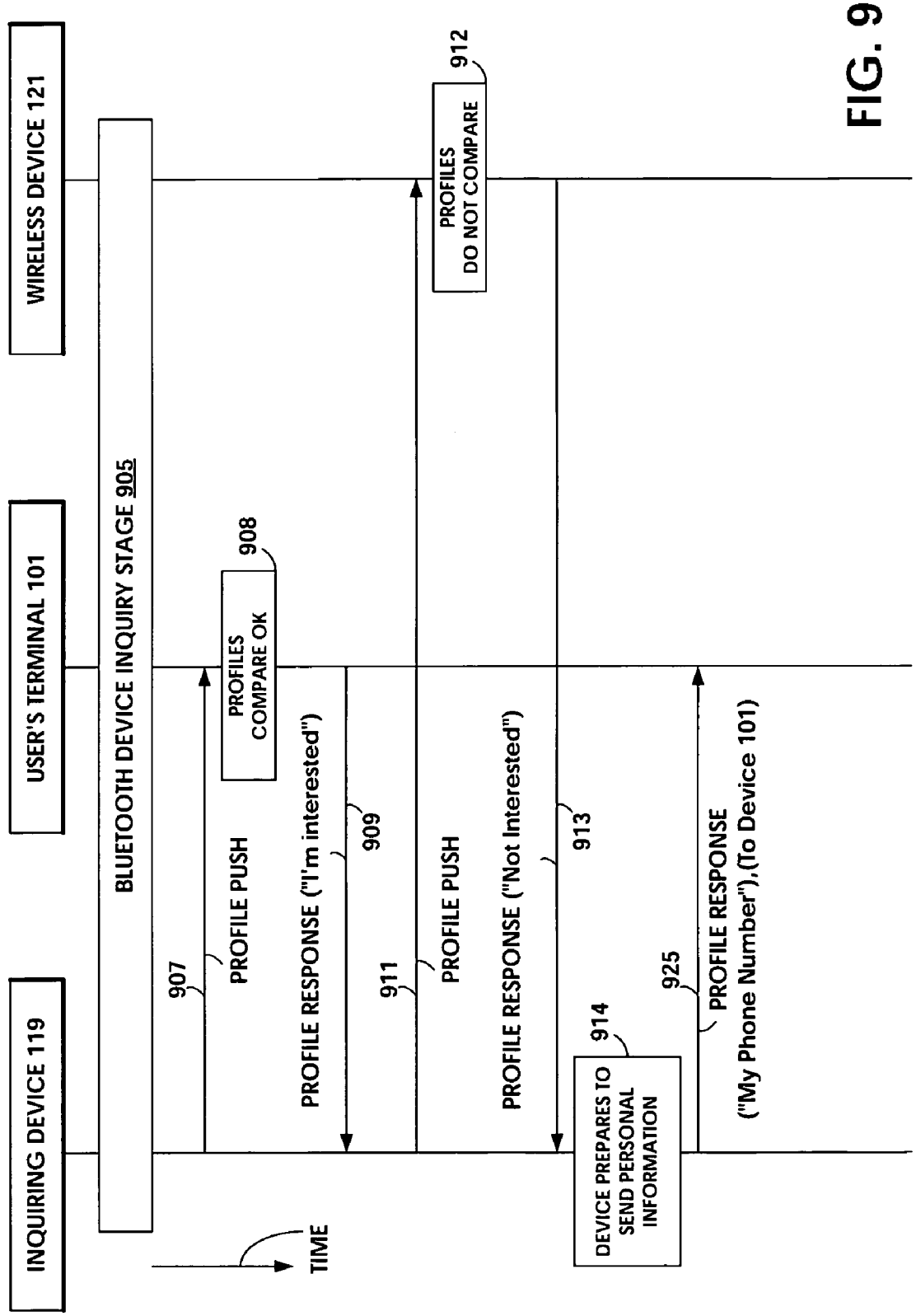
FIG. 9 is a network process diagram of an embodiment of the invention using profile push and profile comparison between two Bluetooth devices.

In an alternate embodiment of the intention, a push-mode enables the user's terminal to broadcast user profile information. FIG. 9 is a network process diagram of an embodiment of the invention using profile push and profile comparison between two Bluetooth devices. Inquiring device 119, user's terminal 101, and wireless device 121 engage in a Bluetooth device inquiry stage 905. Then, inquiring device 119 sends a profile push message 907 to the user's terminal 101. The profile push message 907 contains enough information to characterize the profile in inquiring device 119 so as to enable user's terminal 101 to compare the similarity between the user profiles in the two devices. Such characterizing information can be some limited information about the user or the user's device 119, for example. Such characterizing information can be a bit mask, which can be examined by the user's terminal 101 in step 908, comparing its value with reference bit mask values indicating any generic interests. In this example, user's terminal 101 determines at step 908 that the two user profiles compare sufficiently to justify expressing an interest in obtaining more information about the profile of inquiring device 119. Then the user's terminal 101 returns a profile response 909, such as "I'm interested", to the inquiring device 119. In the meantime, the inquiring device 119 sends another profile push message 911 to the wireless device 121, similar to message 907. In this example, the wireless device 121 determines at step 912 that the two user profiles do not compare Then the wireless device 121 returns a profile response 913, such as "Not interested", to the inquiring device 119. In response to the profile response 909, "I'm interested", sent by the user's terminal 101 to the inquiring device 119, the inquiring device 119 prepares to send personal information in step 914. The inquiring device 119 sends a profile message 925 to the user's terminal 101 with the profile information "My Phone Number".

FIG. 10 is a network process diagram of the embodiment of FIG. 9, adding authentication between the two Bluetooth devices. Following step 914, the inquiring device 119 sends an authentication request 915 to the user's terminal 101. In step 916, both users input the same PIN on their respective devices 101 and 119. Then the user's terminal 101 returns an authentication response 917 to the inquiring device 119. Then, the inquiring device 119 sends the profile message 925 to the user's terminal 101 with the profile information "My Phone Number".

In another alternate embodiment of the invention, the user's short-range wireless terminal can share information in its personal profile with the inquiring wireless terminal, if their respective user profiles match within a predefined tolerance.

In another alternate embodiment of the intention, the user's short-range wireless terminal can share the general information portion of his/her local user profile with another short-range wireless terminal, if their respective user profiles have a first level of close matching. If their respective user profiles have a second level of closer matching, the two terminals can further share more detailed information in their respective user profiles.

General information can be transferred in a push model, without authentication of the receiving party and even without Bluetooth encryption. However, sending of the more detailed, private part of the user's profile should be protected by Authentication and Encryption. For example, before sending the more detailed, private part of the profile, the sending device triggers the exchange of the Bluetooth PIN between the sender and the receiver (if that has not been done before) to turn on the encryption of the baseband connection. In the same way, and in the case of the Pull model, the Pull request for the more detailed, private part of the profile triggers the device owning the profile to request Authentication of the device that issues the Pull request.

Bluetooth Authentication usually requires that the two users exchange the PIN outside the channel, such as orally. In some scenarios, this may not desirable. The invention provides other ways for the two users to share a secret without orally communicating with each other. The server 129 in FIG. 1 can provide matchmaking via Bluetooth links by registering users, such as the users of devices 101 and 119. Registration can include checking user qualifications for matchmaking, such as being above a certain age. Then, when the two respective registered users of devices 101 and 119 try to exchange privacy sensitive information without having to actually engaged in a conversation with each other, they link to the server 129, which delivers the same PIN to both devices 101 and 119, thereby enabling the Bluetooth Authentication procedure to run automatically in the background for both devices 101 and 119.

In addition to the Bluetooth standard, the resulting invention applies to wireless standards such as the IEEE 802.11 Wireless LAN standard, the HIPERLAN standard, the IEEE 802.15 Wireless Personal Area Network (WPAN) standard, the Infrared Data Association (IrDA) standard, the Digital Enhanced Cordless Telecommunications (DECT) standard, the Shared Wireless Access Protocol (SWAP) standard, the Japanese 3rd Generation (3G) wireless standard, and the Multimedia Mobile Access Communication (MMAC) Systems standard of the Japanese Association of Radio Industries and Businesses.

While the invention has described in connection with a preferred embodiment, various changes can be made without departing from the spirit and scope of the invention.

What is claimed is:

1. A method in a user's short-range wireless terminal for sharing the user's personal profile with an inquiring wireless terminal in a wireless network, comprising:
   entering the user's personal profile in a service discovery protocol (SDP) database of the user's short-range wireless terminal;
   editing the personal profile while in the user's short-range wireless terminal in response to the user's input wherein a form of the user's personal profile is entered in the service discovery protocol (SDP) database; and
   transmitting the user's personal profile from the user's short-range wireless terminal to an inquiring wireless terminal wherein the user's short-range wireless terminal shares general information in the user's personal profile with the inquiring wireless terminal, if their respective user profiles have a first level of close matching, and the user's short-range wireless terminal shares detailed, private information in the user's profile with the inquiring wireless terminal, if their respective user profiles are determined to have a second level of close matching, which is closer than the first level.

2. The method of claim 1, wherein the user's short-range wireless terminal and the inquiring wireless terminal are Bluetooth devices.

3. The method of claim 2, which further comprises:
   setting the user's short-range wireless terminal in a state to permit the user's personal profile to be accessed by and respond to inquiring wireless terminals.

4. The method of claim 2, which further comprises:
   filtering incoming messages from the inquiring wireless terminal by the user's short-range wireless terminal.

5. The method of claim 2, wherein said editing the personal profile stored in the user's terminal further comprises:
   displaying an index screen in the user's terminal to enable the user to access a process screen for editing and removing keywords related to the processes; and
   editing and updating the personal profiles using a user interface of the user's terminal.

6. The method of claim 2, which further comprises:
   uploading the personal profiles via a network and storing them at a centralized database;
   enabling editing of the personal profiles on a computer coupled to the centralized database; and
   downloading the edited personal profiles to the user's terminal.

7. The method of claim 2, wherein said entering the user's personal profile further comprises:
   installing the user's personal profile into a database divided into a phone book section containing the user's personal profile and a more detailed data section for detailed personal information.

8. The method of claim 7, wherein said installing the user's personal profile further comprises:
   writing generic information, such as name and contact information into the phone book section.

9. The method of claim 7, wherein said installing the user's personal profile further comprises:
   writing detailed personal information into the more detailed data section, such as sports interests and hobby interests.

10. The method of claim 2, wherein said responding step further comprises:
    responding in a SDP transaction to provide a format for the requested information.

11. The method of claim 10, wherein said responding step further comprises:
    providing additional references in the response by providing links to additional user defined information from the database in an object exchange (OBEX) transaction.

12. The method of claim 11, wherein said responding step further comprises:
    sending the user information from the user's phonebook, encoded in a vCard electronic business card format.

13. The method of claim 11, wherein said responding step further comprises:
    sending the personal profiles encoded in extended markup language (XML).

14. The method of claim 1, wherein said entering the user's personal profile further comprises:
    including a list of user interests in the SDP database defined by a plurality of fields, each field including a series of attributes, where each attribute is defined by a name, a type, and a value.

15. The method of claim 14, wherein said entering the user's personal profile further comprises:
    including a bit mask characterizing each specified interest.

16. The method of claim 14, wherein said entering the user's personal profile further comprises:
    storing a full complement of personalization data in one SDP database record.

17. The method of claim 1, wherein the user's short-range wireless terminal transfers information from the user's personal profile in a pull model to the inquiring wireless terminal.

18. The method of claim 1, wherein the user's short-range wireless terminal transfers information from the user's personal profile in a push model to the inquiring wireless terminal.

19. The method of claim 1, wherein the user's short-range wireless terminal transfers general information to the user's personal profile in a push model to the inquiring wireless terminal, without authentication or encryption.

20. The method of claim 19, wherein more detailed, private information in the user's profile is protected by authentication and encryption.

21. The method of claim 20, wherein before sending the more detailed, private information in the user's profile, the user's short-range wireless terminal invokes encryption of a baseband connection with the inquiring wireless terminal.

22. The method of claim 1, wherein the user's short-range wireless terminal transfers general information to the user's personal profile in a pull model to the inquiring wireless terminal, without authentication or encryption.

23. The method of claim 22, wherein more detailed, private information in the user's profile is protected by authentication and encryption.

24. The method of claim 23, wherein before sending the more detailed, private information in the user's profile, the user's short-range wireless terminal invokes encryption of a baseband connection with the inquiring wireless terminal.

25. The method of claim 1, wherein the user's short-range wireless terminal and the inquiring wireless terminal register with a server.

26. The method of claim 25, wherein the server provides matchmaking via Bluetooth links to the short-range wireless terminal and the inquiring wireless terminal based on their having registered with the server.

27. The method of claim 26, wherein the registering includes checking user qualifications for matchmaking.

28. The method of claim 26, wherein when two registered users attempt exchanging privacy sensitive information, they link to the server to obtain a PIN, thereby enabling a Bluetooth authentication procedure for both the short-range wireless terminal and the inquiring wireless terminal.

29. The method of claim 1, wherein the user's short-range wireless terminal shares information in the user's personal profile with the inquiring wireless terminal, if their respective user profiles match within a predefined tolerance.

30. A mobile terminal containing personal profiles for access by other terminals in a short-range wireless communication system, comprising:
 a) a database in the terminal containing user defined profiles;
 b) database-managing apparatus to edit the user defined personal profiles based upon user input;
 c) screen display apparatus which displays the personal profiles for user access contained in service discovery protocol (SDP) database records;
 d) terminal apparatus responsive to inquires from other terminals for access to the user defined profiles; and
 e) matching apparatus in the wireless device which shares general information in the user's personal profile with the inquiring wireless terminal, if their respective user profiles have a first level of close matching wherein the user's wireless device shares more detailed, private information in the user's personal profile with the inquiring wireless terminal, if their respective user profiles are determined to have a second level of close matching, which is closer than the first level.

31. The terminal of claim 30, further comprising:
 f) records defining each profile stored in the database.

32. The terminal of claim 30, further comprising:
 g) personalization apparatus which sets the terminal in a personalization state to permit access by other terminals in a transaction.

33. The terminal of claim 30, further comprising:
 h) searching apparatus which searches the short-range communication network for other terminals having matching personal profiles.

34. The terminal of claim 30, further comprising:
 i) remote profile storing apparatus which stores the user defined profiles in a remote centralized database for access by the user via a network.

35. A system for sharing a user's personal profile with an inquiring wireless terminal in a short-range wireless network, comprising:
 a wireless device including a database containing a user's personal profile;
 an inquiring wireless terminal capable of connecting to the wireless device via a short-range wireless network;
 personalization apparatus which sets the wireless device in a personalization state to permit access by inquiring wireless terminals in a transaction wherein the user's personal profile is contained in the service discovery protocol (SDP) database records; and
 matching apparatus in the wireless device which shares general information in the user's personal profile with the inquiring wireless terminal, if their respective user profiles have a first level of close matching wherein the user's wireless device shares more detailed, private information in the user's personal profile with the inquiring wireless terminal, if their respective user profiles are determined to have a second level of close matching, which is closer than the first level.

36. The system of claim 35 further comprising:
 the service discovery protocol records stored in the database.

37. The system of claim 35, wherein the user's device shares information in the user's personal profile with the inquiring wireless terminal, if their respective user profiles match within a predefined tolerance.

38. The system of claim 35 wherein a list of user interests is contained in the SDP database records.

39. The system of claim 35 wherein the SDP database records are defined by a plurality of fields, each field including a series of attributes, where each attribute is defined by a name, a type, and a value.

40. A method in a wireless terminal, comprising:
 entering personal profile of a user of the wireless terminal in a database of the wireless terminal in response to the user's input, wherein the personal profile includes general information and more detailed private information of the user;
 conducting service discovery with a proximate wireless terminal by transmitting the general information of the user's personal profile to the proximate wireless terminal as service discovery protocol (SDP) database records and receiving corresponding personal profile information regarding a user of the proximate wireless terminal; and
 transmitting the more detailed private information of the user's personal profile to the proximate wireless in response to determining that there is a close match between the SDP database records and the received corresponding personal profile information of a user of the proximate wireless terminal.

41. A wireless terminal, comprising:
 a memory configured for storing a personal profile of a user of the wireless terminal entered in a database of the wireless terminal in response to the user's input, wherein the personal profile includes general information and more detailed private information of the user; and
 a transmitter configured for conducting a service discovery protocol (SDP) with a proximate wireless terminal by transmitting the general information of the user's personal profile to the proximate wireless terminal as service discovery protocol (SDP) database records and receiving corresponding personal profile information regarding a user of the proximate wireless terminal, wherein
 the transmitter is further configured for transmitting the more detailed private information of the user's personal profile to the proximate wireless in response to determining by the wireless terminal that there is a close match between the more detailed private information and the received corresponding personal profile information of a user of the proximate wireless terminal.

42. A computer program product, executable in a computer system, for sharing a user's personal profile with an inquiring wireless terminal in a short-range wireless network, comprising:
- a computer readable medium including programming instructions for performing the following operations:
- (i) entering a personal profile of a user of the wireless terminal in a service discovery protocol (SDP) database of the wireless terminal in response to the user's input, wherein the personal profile includes general information and more detailed private information of the user;
- (ii) conducting service discovery with a proximate wireless terminal by transmitting the general information of the user's personal profile to the proximate wireless terminal as service discovery protocol (SDP) database records and receiving corresponding personal profile information regarding a user of the proximate wireless terminal; and
- (iii) transmitting the more detailed private information of the user's personal profile to the proximate wireless in response to determining that there is a close match between the SDP database records and the received corresponding personal profile information of a user of the proximate wireless terminal.

43. A method in a short-range wireless terminal, comprising
- installing a user's personal profile into a service discovery protocol (SDP) database divided into a phone book section containing the user's personal profile and a more detailed data section for detailed personal information;
- editing the personal profile installed in service discovery protocol (SDP) database records in response to the user's input; and
- transmitting the user's personal profile from the user's short-range wireless terminal to an inquiring wireless terminal including user profiles wherein the user's short-range wireless terminal shares general information in the user's personal profile with the inquiring wireless terminal, if their respective user profiles have a first level of close matching, and the user's short-range wireless terminal shares detailed, private information in the user's profile with the inquiring wireless terminal, if their respective user profiles are determined to have a second level of close matching, which is closer than the first level.

* * * * *